United States Patent [19]

Met

[11] 3,997,267
[45] Dec. 14, 1976

[54] LASER APPARATUS FOR PROJECTING A NARROW BEAM OF LIGHT AS A REFERENCE LINE

[75] Inventor: Viktor Met, Palo Alto, Calif.

[73] Assignee: Micro-Grade Laser Systems, Mountain View, Calif.

[22] Filed: June 21, 1972

[21] Appl. No.: 264,945

[52] U.S. Cl. .............................. 356/138; 356/153; 356/248; 356/255
[51] Int. Cl.² .................. G01B 11/26; G01C 1/00; G02B 27/32
[58] Field of Search .......... 356/138, 153, 248, 255; 331/94.5 A; 33/281, 283

[56] References Cited
UNITED STATES PATENTS

| | | | |
|---|---|---|---|
| 2,997,912 | 8/1961 | Mikic | 356/250 |
| 3,471,234 | 10/1969 | Studebaker | 331/94.5 A X |
| 3,528,424 | 9/1970 | Ayres | 331/94.5 A |
| 3,612,700 | 10/1971 | Nelson | 356/153 |
| 3,635,565 | 1/1972 | Colson | 356/153 |
| 3,652,166 | 3/1972 | Bessko et al. | 356/153 |
| 3,653,384 | 4/1972 | Swope | 331/94.5 A |
| 3,684,381 | 8/1972 | Zoot | 356/138 |

OTHER PUBLICATIONS

Wallace, K. M., "Maser Surveying," Surveying & Mapping vol. 22, No. 4, 1962 [TV Berlin 8Z1415], pp. 550–554.

*Primary Examiner*—John K. Corbin
*Assistant Examiner*—Wm. H. Punter
*Attorney, Agent, or Firm*—Limbach, Limbach & Sutton

[57] ABSTRACT

Apparatus for providing a reference line for surveying, pipelaying and related purposes includes a laser source, means for automatically leveling the beam from the laser source, regardless of the orientation of the entire instrument, and means for deflecting the leveled beam to a desired angle relative to horizontal, also regardless of the orientation of the entire instrument.

8 Claims, 8 Drawing Figures

LASER APPARATUS FOR PROJECTING A NARROW BEAM OF LIGHT AS A REFERENCE LINE

BACKGROUND OF THE INVENTION

The present invention relates to a laser used to provide a reference line, and, more particularly, to a laser useful to provide a reference line in applications such as surveying and laying and aligning pipe.

A laser beam has been found to be useful in many surveying applications, and, for example, as a reference line for the predetermined guidance of equipment, either for tunneling, for hydraulic pipe pressing, irrigation work, alignment of railroad tracks and other applications. In these applications, the laser beam is used as a reference line, either on a level or horizontal plane or inclined a predetermined angle from horizontal.

One particularly suitable application for laser alignment systems is for aligning and laying pipeline. For pipe laying applications, a deviation of 1/100 foot per 100 feet due to mounting instabilities is no longer acceptable for runs over 300 feet length. This means that the support of conventional instruments has to be better than 1/1000 inch per foot, or roughly 20 arc-seconds. This is not easy to realize and involves sophisticated mounting equipment as well as repeated checking and readjustment.

Heavy equipment moving about the site for the purpose of excavating, laying of the joints, safetying, backfilling, pouring of concrete for manholes and bases, etc., with the associated vibration and shifting of large weights causes the pipeline to settle and move. The corresponding angular motion of a specific joint can typically range from a few seconds to minutes of arc, depending on the specific conditions.

If the grade instrument is anchored to a particular joint of pipe, for reasons of maximum mechanical rigidity, these angular variations of the position of the joint will cause proportionate wandering of the laser beam, of up to several hundreds of a foot per 100 feet distance. Similarly, instruments mounted on tripods or other means of mechanical support, with a separating layer of soil or fill between their base and the pipe-line, will be subject to settling and wandering of the reference axis, causing similar effects and errors.

In the prior art systems, frequent readjustment is required. During the operation of one prior art device, drifts from 20 to 60 seconds were typically observed over periods of an hour, depending on the specific job situation.

SUMMARY OF THE INVENTION

The present invention offers means to eliminate completely these problems. Described herein are means for maintaining automatically an accurate reference for both line and grade, through self-leveling devices integral to the complete instrument. While line and grade can thus be monitored and maintained up to the practical limits of resolution, i.e. a few thousandths of one percent grade and a few hundredths of one foot per 100 feet on line, the required accuracy on leveling the housing of the instrument by a coarse leveling device can be relaxed by several orders of magnitude.

Thus, in accordance with the present invention, laser alignment apparatus is provided wherein the output from a laser, after being coarsely aligned to provide an approximately level output beam, is automatically positioned so as to be exactly horizontal or level. Thereafter, means are provided for redirecting the laser beam at a desired angle relative to horizontal.

In one embodiment of the invention, the automatic leveling means comprises a well-known type pendulum compensating optical device. In the operation of such an optical device, an incoming beam inclined at an angle from horizontal, due, for example, to the settling of a pipe to which the instrument is mounted, will automatically be re-directed into a horizontal plane.

In accordance with another embodiment, the laser itself is mounted by a pendulum suspension. Thus, if the instrument is tilted during the pipe laying procedure, the beam from the laser will automatically remain level or horizontal.

In accordance with the invention, means are provided for re-directing the laser beam once the beam has been horizontally oriented. As will be explained, this can be accomplished in several ways, as, for example, by utilizing sliding level weights to tilt either the optical system or, when the laser itself is pendulum suspended, the laser itself, so as to re-direct the beam to the desired angle. Various optical means can also be provided to deflect or refract the beam to the desired angle.

In a preferred embodiment of the invention, an optical deflecting system including one rotatable mirror or prism is utilized to deflect the laser beam with respect to the horizontal plane. Preferably, the optical deflecting system includes a second mirror or prism which is stationary.

With the preferred optical deflecting system within a certain range of compensation the inclination of the emerging beam is independent of tilting of the entire instrument. Additionally, with this arrangement, the automatic level means and the optical deflecting system operate independently of each other and, when the rotatable mirror is rotated to establish the desired output beam angle, the automatic level, and hence the optical axis of the system is not affected.

When rotating a mirror by an angle ($\alpha$) it is well known that a light ray being deflected by the mirror is deflected by twice this angle, $2(\alpha)$. In the construction industry, one usually uses "grade" to define the angle of a reference line in relation to horizontal. Grade is exactly equivalent to the tangent of the angle of the reference beam to the horizontal plane. On the other hand, the tangent of the half angle is not equal to one-half the tangent of twice the angle, unless the angles are very small. Therefore, such an arrangement cannot be combined with a linear display mechanism in order to display the tangent of the tilted angle of the beam. Such a device would display the tangent of one-half of the angle by which the beam is being tilted, corresponding to the effective angle of rotation about the mirror axis.

Of course, one could equip the readout with a non-linear scale which is especially calibrated for the specific arrangement and hich directly displays the tangent of the tilted beam. This is undesirable since it leads to unnecessary complexity and requires parts which must be specially designed and built for the arrangement described.

In accordance with the present invention a novel arrangement is provided for the rotation of a mirror incorporating compensation for the differences between the tangent of an angle and one-half the tangent of twice the angle. Thus, it is possible to directly read on the linear scale the tangent of twice the angle from the angle represented by the adjustment of the rotatable mirror.

Thus, a lever is rigidly attached to the rotatable mirror and the axis of the lever intersects the axis of rotation of the rotatable mirror. The mirror is rotated by tilting its free end. The vertical distance or displacement of the end of the lever is read by a micrometer or other suitable linear read-out device. Alternately, a single micrometer device can be used in place of separate lever displacement and micrometer devices.

The free end of the lever is guided along a circle having a radius equal to one-half the distance of the guide surface to the axis of rotation of the mirror. Thus, the length or the effective length of the level is variable.

When the rotatable mirror is set to provide a horizontal reference beam, the length of the lever is equal to twice the distance required to displace the micrometer actuator in order for it to display 100% grade deflection. Or, more generally, the length of lever should be equal to $2r$ where $r=100\Delta x$, and $\Delta x = a$ unit of display of the dial indicator. The actual or effective length of the lever increases as the mirror is rotated to provide greater deflection of the output beam as it follows the circle. The correct angular deflection of the emerging laser beam can then be read-out by the linear display.

DESCRIPTION OF THE PREFERRED
EMBODIMENTS OF THE INVENTION

Figure 1:
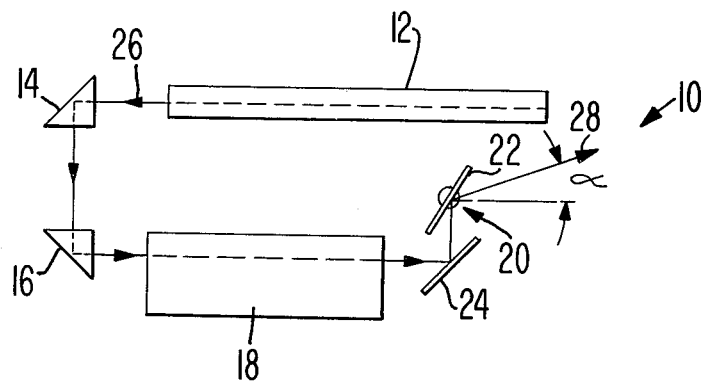
FIG. 1 is a schematic illustration of a preferred embodiment of the invention.

A schematic illustration of a preferred embodiment of the invention is shown in FIG. 1. Laser reference apparatus 10 includes a laser source 12, first and second deflection prisms 14 and 16, automaic level means 18 and optical deflecting means 20 for the deflection of the beam consisting of a rotatable mirror 22 and a stationary mirror 24.

The laser beam 26 emerging from the laser source 12 first is reversed by prismms 14 and 16 in order to save space and subsequently enters the automatic level 18 which provides a horizontal or level beam. Typically the automatic level accomplishes the emergence of a level beam due to optical components suspended in pendulum fashion in a well known manner.

The laser beam which is now level is fed into the optical deflection system 20 comprising mirrors 24 and 22 in successive order with respect to the beam. Mirror 22 is suspended in rotatable fashion to permit adjustment of its inclination with respect to mirror 24.

As previously explained, such a deflection system 20 rotates the entering beam always by the same angle, independent of tilting of the incoming beam. Thus the beam emerging from the optical deflection system 20 always has the precise and predetermined angle ($\alpha$) with respect to the true horizontal reference.

Figure 2:
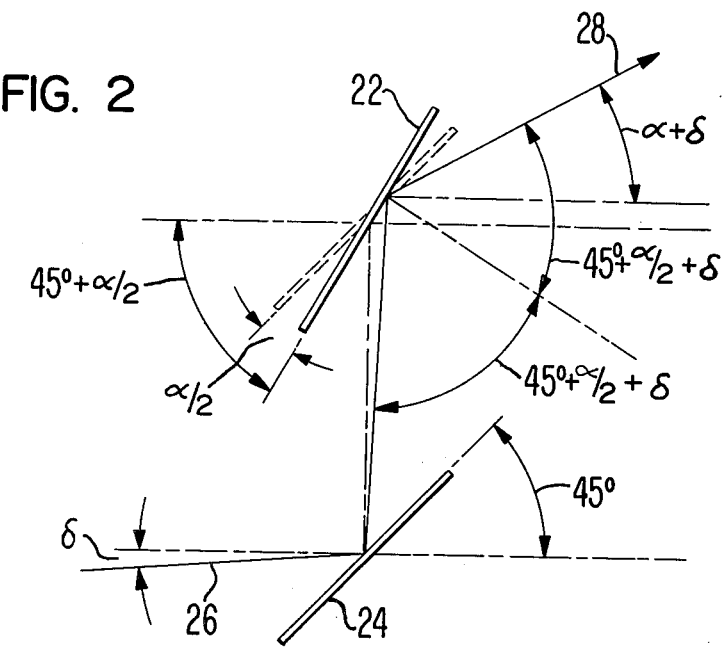
FIG. 2 is a graphical illustration of a principle of operation of the embodiments illustrated in FIGS. 1 and 3.

To show how tilting of the optical deflection system 20 shown in FIG. 1 does not cause an effect on the adjusted tilting angle of an emerging beam, reference is made to FIG. 2. Assume that a deflection system which consists of mirrors 22 and 24 is rotated by an angle ($\delta$) with respect to the horizontal plane. In order to simplify FIG. 2, the deflection system 20 has been rotated by the angle to be adjusted, but mirrors 22 and 24 are shown untilted and instead the beam emerging from the automatic level is assumed to have tilted by the angle ($\delta$). Mirror 24 is rigidly mounted, for example, at an angle of 45° with respect to the horizontal plane. Mirror 22 is rotated by an angle ($\alpha$) with respect to th plane of mirror 24 in order to make the emerging beam 28 inclined by an angle ($\alpha$) when leveling the optical deflection system 20. As can be seen in FIG. 2, the beam tilted by the angle ($\delta$) emerges at an angle ($\alpha$) plus ($\delta$) with respect to the level plane.

This is due to well known principles of geometrical optics, based on the fact that the angle of entrance and the angle of exit at a mirror are equal with respect to its surface normal. Thus, a beam that has been tilted is rotated only by the angle set in the deflection system 20. In FIG. 2 a tilted beam is equivalent to a non-tilted beam and a corresponding tilt of the entire system. Therefore, the deflection system deflects any entering beam by the same amount, independent of tilting of the system of the entering beam.

The invention is not limited to the example shown. Especially it is not required to deflect the laser beam by 180°. One could also realize the optical deflection system by two prisms. For example, two identical prisms could be arranged in the optical path such that they assume the configuration of a cube separated by an air gap parallel to a plane defined by two parallel minor diagonals of the sides of the cube. If the two prisms are counter-rotated by the same angle about an axis parallel to the horizontal laser beam, the inclination caused is independent of tilting of the entire system, at least for small amounts of tilt.

Figure 3:
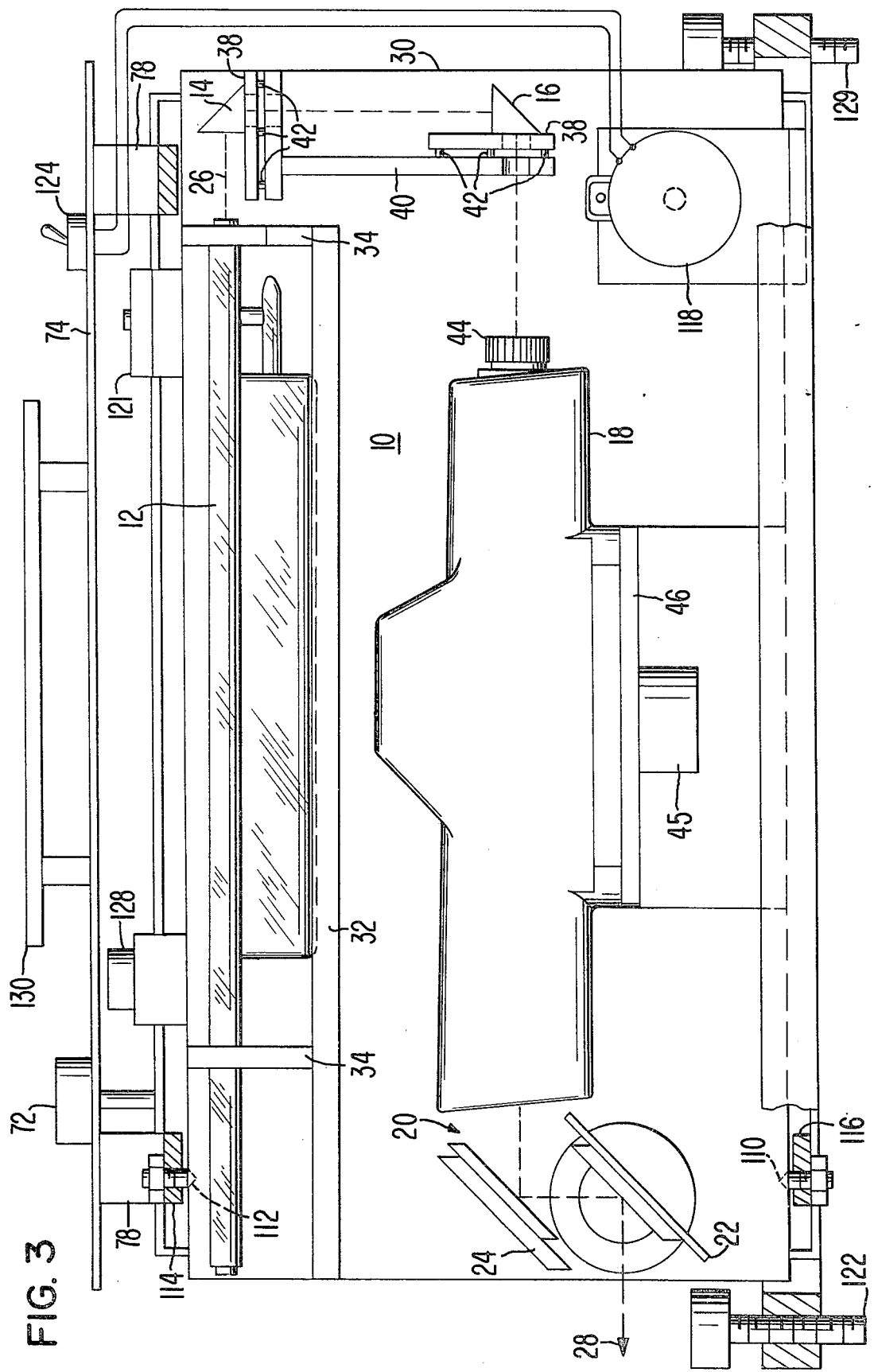
FIG. 3 is a detailed illustration of the embodiment schematically shown in FIG. 1.

A more detailed illustration of an actual embodiment employing the features of the present invention is illustrated in FIG. 3. The laser source 12, beam-folding prisms 14 and 16, automatic level 18 and the optical deflection system 20 are all mounted to one side of the internal mounting plate 30 which in turn is mounted on a frame mounted within a suitable housing, not shown.

Laser source 12 is secured to the mounting plate 30 by a laser mounting carriage 32 secured by brackets 34. Any low output laser is suitable in this application, such as, for example, a Spectra-Physics model 060 helium-neon laser, which provides a 2 milliwatt beam at 6328A (red).

Each of the right-angle prisms 14 and 16 are attached to prism holders 38 which are adjustably secured to a suitable prism support 40 by set screws 42. By adjustment of the set screws 42, angular adjustment of the beam as well as radial adjustment of the beam with respect to the level instrument 18 can be achieved.

The automatic optical level 18, in this example, is made by Path Instruments International Corporation, 16 Hudson St., New York, N.Y. 10013, Model S-302. It includes a pendulum compensation otics mounted with sub-housing 45. Only minor modifications of this instrument are required. The reticle assembly is removed and an auxiliary ocular lens is provided to demagnify the beam upon entrance. However, the overall magnification of the instrument must not be changed as it enters into the compensation principle involving inversion of angle at the 2f point of the image inversion lens.

The automatic level 18 includes telescopic A lens assembly including an input lens assembly 44 and an object lens, not shown. The effect of the telescope is to enlarge the cross-sectional area of the laser beam. This has the desirable effect of reducing the divergence of the laser beam upon leaving the instrument.

The automatic level 18 is suitably mounted to a support bracket 46, extending perpendicularly to and mounted to the internal mounting plate 30.

The stationary mirror 24 of the optical deflection means 20 is mounted to the mounting plate 30 at an angle of 45° to the path of the laser beam from the automatic level 18. The rotatable mirror 22 is selectively rotated by a mechanical grade setting assembly, mounted on the reverse side of plate 30, and which will be described in detail subsequently.

As previously explained, the combination of stationary mirror 24 and angularly movable second mirror 22 produces the constant deflection of the level beam obtained from 18, at the angle determined by the mechanical grade setting assembly, independent of small deviations of the support plate 30 about a horizontal axis.

Figure 4:
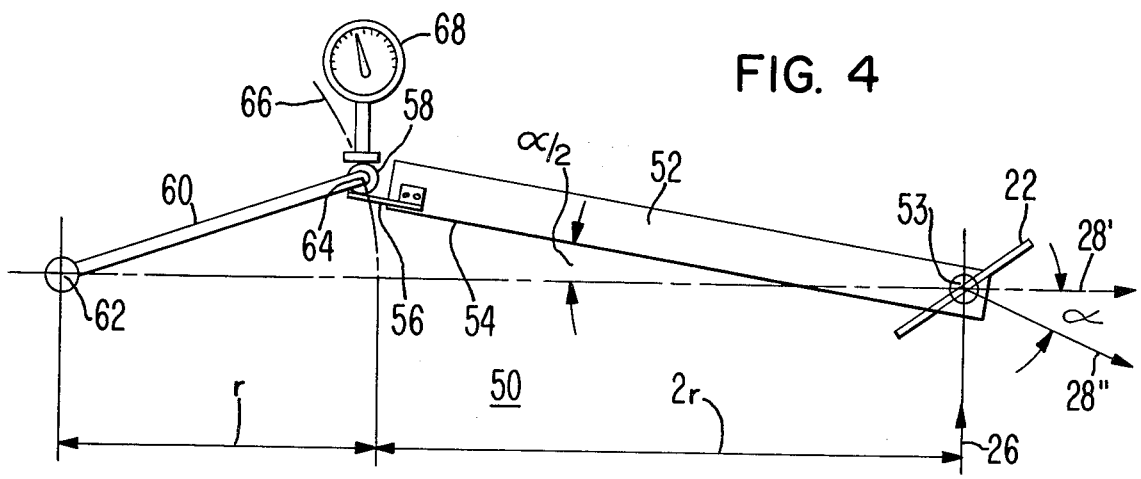
FIG. 4 is a schematic illustration of the grade setting assembly in accordance with the invention.
Figure 5:
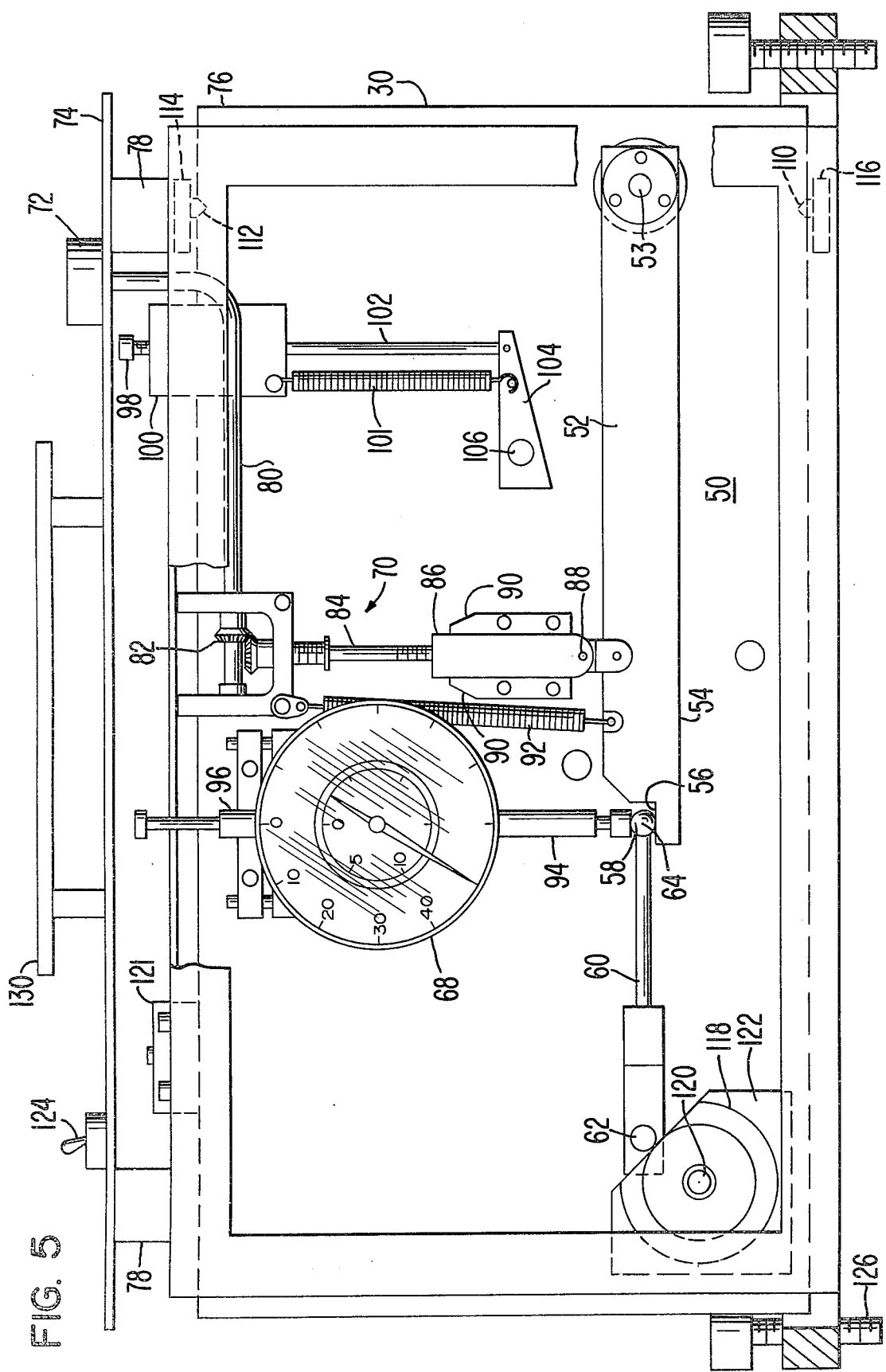
FIG. 5 is a detailed illustration of the grade setting assembly shown schematically in FIG. 4.

A schematic illustration of the mechanical grade setting assembly 50 is shown in FIG. 4 and a detailed illustration of the same of an actual embodiment of the invention is shown in FIG. 5. Assembly 50, mounted on the opposite side of the internal support plate 30 from the laser source and the various optical structures, is responsible for rotating mirror 22.

Grade setting assembly 50 includes a lever 52 having one end mounted to the rotating mirror 22 such that the axis of the lever 52 intersects the axis 53 of the rotatable mirror 22. The laser beam 26, after leaving stationary mirror 24 strikes mirror 22 at an angle of 45° and it leaves the mirror in the direction of the dotted horizontal line 28'. In order to accomplish an angle ($\alpha$) of the reflected ray 28" with respect to the horizontal line, the mirror must be rotated in well known fashion by ($\alpha$)/2. For this purpose, the mirror is connected to the lever 52, which has an effective length of $2r$ where $r = 100\Delta x$, and $\Delta x$ is equal to a unit of display of the dial indicator 68.

At the free end 54 of lever 52 there is a guide surface 56 on which a sphere 58 slides. Slide 56 is positioned parallel to the lever axis and one-half the diameter of the sphere 58 below the axis of rotatable mirror 22. Sphere 58 is secured to a compensating arm 60 which ha a predetermined length $r$ and which is mounted rotatably about an axis located at a center 62 which has a distance $3r$ from the axis of rotation of mirror 22. In this fashion, tilting of the lever 52 places the center of sphere 58 in the position of the end point 64 of a specifically varying length of the lever 52 with the center 64 being guided along circular path 66 which has a radius $r$.

A dial indicator 68 touching the sphere 58 indicates the height of displacement of the sphere over the horizontal line. It has a scale which displays the height above the horizontal line divided by the length $r$, and for a distance of $2r$, the dial indicator is directly calibrated in terms of the tangent of the angle of deflection ($\alpha$).

Figure 6:
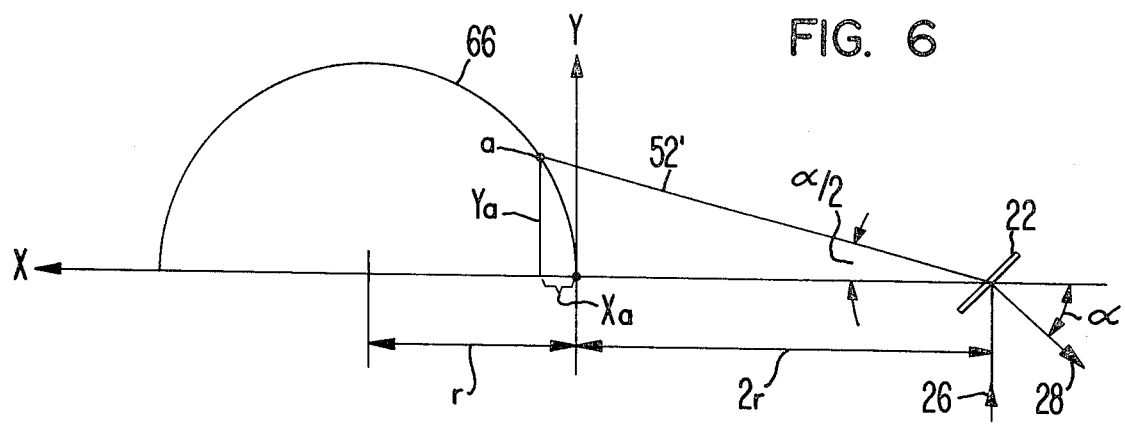
FIG. 6 is a graphical illustration of the principle of operation of the grade setting assemblies of FIGS. 4, 5 and 7.

Referring now to FIG. 6, it will be explained how the movement of the lever 52 with an effective or actual variable length along a circular surface with defined radius of curvature accurately accomplishes the display of tangent ($\alpha$).

The straight line 52' in FIG. 5 corresponds to the lever 52 in FIGS. 4 and 5. Assume to have the linear display 68 oriented in the Y-axis. Recall that the grade, which is to be displayed corresponds to the tangent of the angle ($\alpha$). For small angles:

$$\tan \alpha = 2 \tan \frac{\alpha}{2} \cdot \left[ \frac{1}{1 - \tan^2(\alpha/2)} \right] \approx 2 \tan \left( \frac{\alpha}{2} \right) \left[ 1 + \tan^2 \left( \frac{\alpha}{2} \right) \right]. \quad (1)$$

From FIG. 5 one can conclude that:

$$Y_a = (2r + X_a) \cdot \tan(\alpha/2). \qquad 2.$$

In order to arrive at the display of the actual tilting angle ($\alpha$) of the beam, instead of $\alpha/2$, we would like to have $$Y_a = r \tan \alpha. \qquad 3.$$

By substituting (2) and (1) into (3), we would have to have $$X_a = 2r \cdot \tan^2(\alpha/2). \qquad 4.$$

Computing $X_a$ and neglecting higher order terms in $$(r - X_a)^2 = r^2 - Y_a^2, \qquad 5.$$

also derived from FIG. 5, the validity of (4) can indeed be shown, for a certain range of ($\alpha$/2). Therefore, one obtains compensation of the difference between 2 . tangent $\alpha/2$ and tangent ($\alpha$) over a range for which the neglection of higher order terms does not produce practical errors, i.e., roughly ±30° from the horizontal position.

Referring to FIG. 5, the lever 52 is pivoted by means of a lead screw assembly 70. A grade selector knob 72 is rotatably mounted to a top plate 74 which in turn is secured to a support frame 76 by means of mounting blocks 78. To the dial 72 is attached a flexible shaft 80.

The generally horizontal position of the lower end of the flexible shaft 80 is connected through a right-angle gear drive 82 to couple the rotational movement to a lead screw 84. The lead screw 84 which is constrained vertically, when rotating, causes vertical movement of grade drive linkage 86, into which the lead screw 84 is threaded. Linkage 86 is suitably mounted at 88 to the lever 52 to allow relative vertical movement of the lever 52. A pair of guides 90 insure that the linkage moves only in a vertical direction. A return spring 92 holds the level 52 against the drive linkage.

Zero calibration of the grade dial 68 can be adjusted in the field by turning a screw 96, effecting the axial position of the dial indicator housing. The screw is accessible through a removable plug, not shown, in the top plate 74.

Adjustments to the telescope of the automatic level 18, on the reverse side of internal support plate 30, are made by adjusting screw 98 which is supported by block 100. The screw 98 drives a rod 102 which in turn rotates a lever 104 which is mounted at the axis 106 of the telescope focus, not shown. A return spring 108 is provided between the block 100 and the lever 104.

The entire internal support plate 30 is pivotally mounted at 110 and 112 to cross members 114 and 116 respectively. These in turn are secured to the frame 76. In this manner the entire laser-optical assembly is free to pivot about an axis extending vertically between the two pivots 110 and 112. This enables he output beam to be adjusted for proper line, i.e. the correct angular direction in the horizontal plane.

To effectuate line adjustments, a servo motor 118 with suitably reduced gears mounted on the laser-side of the plate 30, drives a small threaded shaft 120. The shaft 120 extends through a shock-mounted, threaded bushing 122. When the shaft is rotated, the bushing 122 moves laterally, thereby rotating the plate 30 about the pivots 110 and 112.

The servo-motor 118 is controlled by switch 124. By suitable electrical extension means, the operaion of the line-adjusting servo-motor can be controlled remotely. This makes it possible to correct line, for example, in the case of pipe-laying from the top of the trench, using hand signals or line transit or other methods.

To know whether the beam of the laser is approximately within the center of the range of angular or line deflection, a small line position indicator 121 is provided. The indicator 121 is positioned so that waste light from the laser passes directly through it to indicate whether the plate is in a balanced or center position, and to indicate any deviation from center. When the servo-motor is energized and plate 30 is rotated slightly about the pivots 110 and 112, the laser beam and hence the "line" will move off center and this is indicated by 121.

The laser reference system 10 rests upon the ground by means of one front leg 122 and two back legs 126 and 129. For example, during the operation of the instrument, it can be set directly inside or on top of the pipe to be laid, or on a flat stone or cinderblock base in a manhole excavation. Desirably, the tips of the legs 122, 126 and 129 are provided with carbide tips.

The legs 122, 126 and 129 are adjustable to enable the operator to adjust the instrument initially so that it is approximately level. As explained previously, a suitably mounted coarse level indicator is used for this purpose, such as a bubble level 128. An accuracy of 10 arcminutes per 1/16 inch is satisfactory.

For convenience of carrying the instrument, a handle 130 is mounted to the top plate. The entire system 10 is mounted within a suitable enclosure (not shown) during use. The enclosure should be sturdy and be at least water repellent and prevent dust and dirt from entering inside the instrument.

With a suitably calibrated dial 68, accuracies of ±0.005 can be realized with the laser reference system 10. With the pivoted mounting plate 30 being driven by the servo-motor 118, line accuracies of ±0.01A can be achieved.

Figure 7:
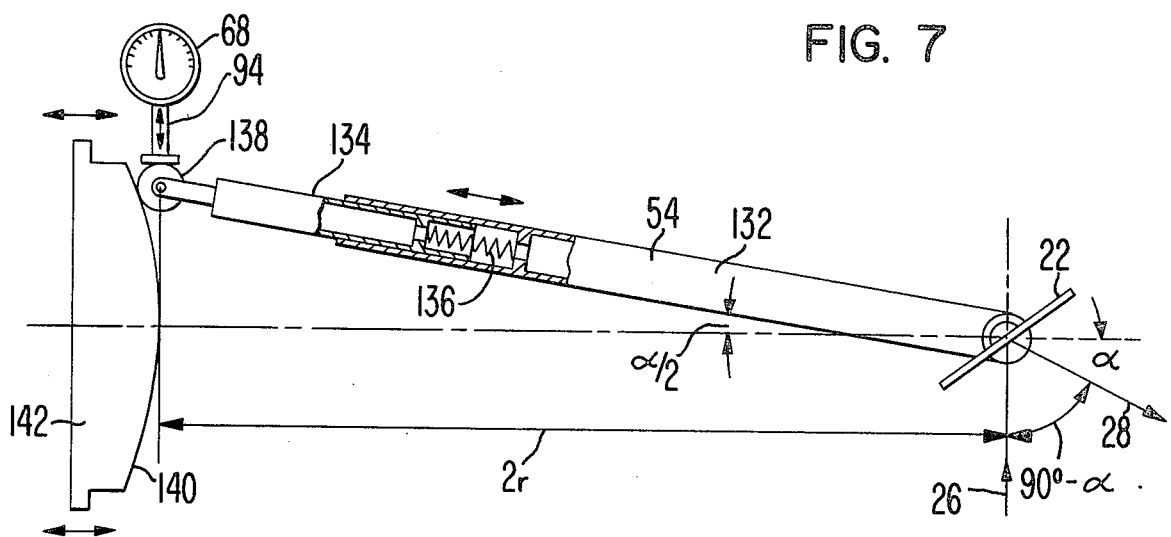
FIG. 7 is a schematic illustration of an alternate embodiment for a grade setting assembly.

An alternate embodiment for a mechanism for rotating mirror 22 is shown schematically in FIG. 7. This arrangement provides the same results as the embodiment of FIGS. 4, 5 and 6.

Here, a lever 52 connected with the mirror 22 consists of two telescoping parts 132 and 134 connected by a spring 136. A wheel 138 positioned at the end of the lever 52 rides upon a circular guide surface 140. This surface can be formed by the edge of a metal piece 142 which is positioned in fixed reference with the axis of mirror 22. Dial indicator spindle 94 engages wheel 138 from above, and as mirror 22 is rotated, wheel 138 rolls along the guide surface 140.

It is not necessary that the optical deflecting means 20 be provided as a stationary and rotatable mirror external to the automatic level optical system 18. For example, the deflecting means can be incorporated as a part of the automatic leveling system. Thus, a first mirror is mounted above a second mirror, with the first mirror having a fixed position with reference to the axis of the laser source. The second mirror is arranged in pendulum fashion to intersect the reflected beam from the first mirror. The pendulum suspension compensates for tilting of the axis of the laser source. The first mirror is rotatable to obtain the desired ouput deflection.

Figure 8:
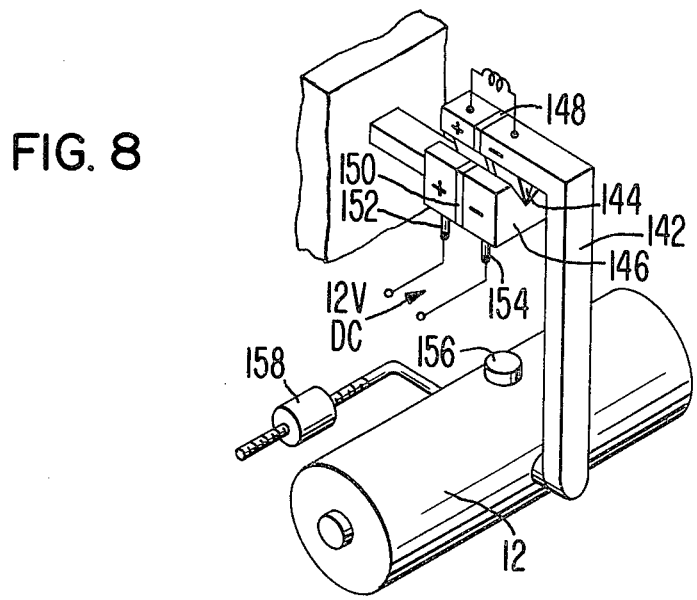
FIG. 8 illustrates another embodiment of the invention.

In accordance with another aspect of the invention, the laser source itself is suspended in a pendulum fashion in order to self-level the output beam, regardless of mis-leveling of the instrument itself. Reference is made to FIG. 8 for such an arrangement. Laser souce 12 is suspended by a pendulum support 143. Support 143 includes a low-friction knife-edge pivot 144, which is free to pivot within a slotted support block 146.

Both the pendulum support 143 and the support block 146 are divided into two parts, indicated by (+) and (−) signs by insulator dividers 148 and 150 respectively. Electrical terminals 152 and 154 secured to the (+) and (−) portions of support block 146 are connected to the power source for the laser 12. In this manner, it is possible to provide power to laser 12 even though the laser is pendulum mounted.

A precision reference bubble level 156 is mounted on the laser 12. It is mounted so as to be exactly parallel with the path of the laser beam. A sliding balance weight 158 mounted to the laser 12 permits precision nulling of the laser beam.

The ouput from the laser in this embodiment can be deflected in the same manner as described for the previous embodiments.

Where mirrors or the laser itself are pendulum mounted, it is possible, in accordance with the invention, to utilize mechanical as opposed to optical means to obtain the desired deflection of the laser beam from horizontal. For example, adjustable or sliding weights can be used to tilt the pendulum suspended reflecting mirrors or laser to obtain the desired deflection. Alternately, adjustment of the pivot point can be used to control and maintain the desired deflection of the beam.

It is also within the scope of the invention to use a servo-controlled system to maintain, automatically, a level laser beam, despite shifting of the entire laser reference instrument. The reference bubble is replaced by an electronic level indicator which in turn feeds a continuous control servo-motor or motors. Once the instrument is set up using a course reference bubble, the servo control unit will automatically maintain level position of the reference frame, to an accuracy of a few seconds if necessary.

I claim:

1. Laser apparatus for projecting a narrow beam of light as a reference line at a desired grade comprising:
    a. a mounting structure;

b. a laser source rigidly secured to said mounting structure for generating a narrow beam of light;

c. leveling means associated with said mounting structure for coarsely adjusting said mounting structure to provide said laser beam in a generally horizontal orientation;

d. means secured to said mounting structure in the path of said laser beam for automatically fine leveling the output beam from said laser source regardless of the grade of the coarsely oriented laser output beam;

e. means secured to said mounting structure for deflecting said fine leveled laser beam at an angle to provide a reference line at a desired grade;

f. wherein said deflecting means comprises:
   i. first optical means comprising a mirror stationarily mounted to said mounting structure so as to deflect the leveled beam from said automatic level means;
   ii. second optical means comprising a mirror mounted to said mounting structure so as to deflect the beam deflected from said first optical means; and
   iii. means for rotating said second optical means to provide the desired deflection angle from horizontal, said rotating means including means for rotating said second mirror at an angle $\alpha/2$ for a desired output angular deflection of $\alpha$ from horizontal;

g. a linear measuring and display device for determining the angular setting of the output reference beam; and h. means for accurately converting the angular setting of said rotatable second mirror to a linear displacement for operation of said linear measuring and display device, said converting means comprising:
   i. a lever having one end secured to the axis of said rotatable second mirror, said lever having a length at one point of $2r$ when said rotatable second mirror is positioned to provide a horizontal output reference beam, where $r = 100 \Delta x$, and $\Delta x$ is equal to a unit of display of the linear measuring and display device;
   ii. means for rotating said lever about its axis to thereby rotate said second mirror;
   iii. means for guiding said point of the free end of said lever along the circumference of a circle as said lever is rotated, said circle having a radius of length $r$ and having its centerpoint in line with said lever when the lever and said rotatable second mirror are set to provide a horizontal output reference beam;
   iv. means for varying the effective length of said lever to enable said point to follow said circular path; and
   v. the setting of said linear measuring and display device being determined by the displacement of said point in a direction perpendicular to the lever when said lever and rotatable second mirror are set to provide a horizontal output reference beam.

2. Laser apparatus as in claim 1 wherein said guide means comprises a compensating arm of length $r$ having one end rotatably mounted at said centerpoint and with the free end intersecting and guided along said lever, the intersection of said compensating arm and said lever defining said point.

3. Laser apparatus as in claim 1 wherein said guide means comprises a circular surface, and said point comprises the end of said lever.

4. Laser apparatus as in claim 3 wherein said lever length varying means comprises a lever having spring-loaded telescopic sections.

5. Apparatus for projecting a laser reference beam at a desired grade comprising:

a. a laser;

b. means for automatically providing the output beam from said laser along a horizontal path;

c. means for selectively deflecting said laser beam at a desired angle relative to said horizontal path wherein said deflecting means comprises
   i. first optical means stationarily mounted so as to deflect the horizontal beam from said automatic means;
   ii. second optical means rotatably mounted so as to deflect the beam deflected from said first optical means; and
   iii. means for rotating said second optical means to provide a desired deflection angle $\alpha$ from horizontal, said rotating means including means for rotating said second optical means an angle of $\alpha/2$ for a desired output angular deflection of $\alpha$ from horizontal;

d. a linear measuring and display device for determining the annular setting of the output reference beam;

e. means for accurately converting the angular setting of said rotatable second optical means to a linear displacement for operation of said linear measuring and display device; and f. wherein said converting means comprises:
   i. a lever having one end secured to the axis of said rotatable second optical means, said lever having a length at one point of $2r$ when said rotatable second optical means is positioned to provide a horizontal output reference beam, where $r = 100\Delta x$, and $\Delta x$ is equal to a unit of display of the linear measuring and display device;
   ii. means for rotating said lever about its axis to thereby rotate said second optical means.

6. Apparatus as in claim 5 wherein said guide means comprises a compensating arm of length $r$ having one end rotatably mounted at said centerpoint and with the free end intersecting and guided aong said lever, the intersection of said compensating arm and said lever defining said point.

7. Apparatus as in claim 5 wherein said guide means comprises a circular surface, and said point comprises the end of said lever.

8. Apparatus as in claim 7 wherein said lever length varying means comprises a lever having spring-loaded telescopic sections.

* * * * *

UNITED STATES PATENT AND TRADEMARK OFFICE
CERTIFICATE OF CORRECTION

PATENT NO. : 3,997,267
DATED : December 14, 1976
INVENTOR(S) : Viktor Met

It is certified that error appears in the above-identified patent and that said Letters Patent are hereby corrected as shown below:

Column 2, line 56, deléte "hich" and insert --which--.

Column 3, line 55, delete "prismms" and insert --prisms--.

Column 4, line 16, delete "th" and insert --the-- line 66, delete "otics" and insert --optics--.

Column 5, line 61, delete "ha" and insert --has--.

Column 6, line 42, delete "($_\alpha$12) and insert --($\alpha$/2)--.

Column 7, line 13, delete "he" and insert --the--.

line 24, delete "operaion" and insert --operation--.

line 63, delete "$\pm$0.01A" and insert --$\pm$0.01%--.

Column 8, line 26, delete "souce" and insert --source--.

Column 10, line 53, delete "aong" and insert --along--.

Signed and Sealed this

Eighth Day of March 1977

[SEAL]

Attest:

RUTH C. MASON
*Attesting Officer*

C. MARSHALL DANN
*Commissioner of Patents and Trademarks*